United States Patent [19]

Fujimoto et al.

[11] 4,196,076
[45] Apr. 1, 1980

[54] SEPARATION OF COBALT AND NICKEL BY SOLVENT EXTRACTION

[75] Inventors: Akihiro Fujimoto, Higashi-Osaka; Isami Miura, Nara; Kazuo Noguchi, Tegukayamani, all of Japan

[73] Assignee: Daihachi Chemical Industry Co., Ltd., Japan

[21] Appl. No.: 906,279

[22] Filed: May 15, 1978

[30] Foreign Application Priority Data

May 14, 1977 [JP] Japan ............................. 52-55872

[51] Int. Cl.² .................................... B01D 11/00
[52] U.S. Cl. .................................. 210/21; 75/119
[58] Field of Search ........................ 210/21; 75/119

[56] References Cited

U.S. PATENT DOCUMENTS

| 3,728,366 | 4/1973 | Michlmayer | 75/119 |
| 4,005,173 | 1/1977 | Pemsler | 75/119 |
| 4,088,733 | 5/1978 | De Schepper | 75/119 |

Primary Examiner—John Adee
Attorney, Agent, or Firm—Wenderoth, Lind & Ponack

[57] ABSTRACT

This invention concerns the method of separation of Co from Ni in an aqueous solution containing Co from Ni salts, with an organic solvent containing 2-ethylhexyl phosphonic acid mono-2-ethylhexyl ester and/or 3,5,5-trimethylhexyl phosphonic acid mono-3,5,5-trimethylhexyl ester and/or isodecyl phosphonic acid monoisodecyl ester as an effective extractant for the separation of Co from Ni, the method which requires fewer stages in the solvent extraction equipment and less organic solvent than the conventional method, and which can very effectively separate Co from Ni in high purity and in high yield. The continuous separation of Co from Ni according to this invention enables the separation of Co with purity above 99% in a yield above 99% and Ni with purity above 99% in a yield above 99%.

9 Claims, 11 Drawing Figures

SEPARATION OF COBALT AND NICKEL BY SOLVENT EXTRACTION

Figure 1A:
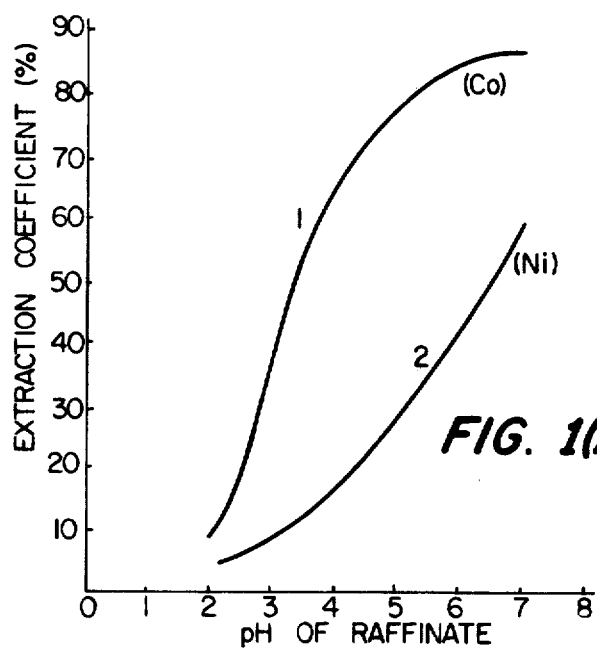
FIGS. 1(A), (B), (C), and (D) show the variation extraction coefficients of Co and Ni extracted into the organic phase from the aqueous solution containing Co and Ni salts with variation pH. (A), (B), (C), and (D) represent the cases where the conventionally used di-2-ethylhexyl phosphoric acid, 2-ethylhexyl phosphonic acid mono-2-ethylhexyl ester, 3,5,5-trimethylhexyl phosphonic acid mono-3,5,5-trimethylhexyl ester, isodecyl phosphonic acid monoisodecyl ester, respectively, were used as the extractant.
Figure 1B:
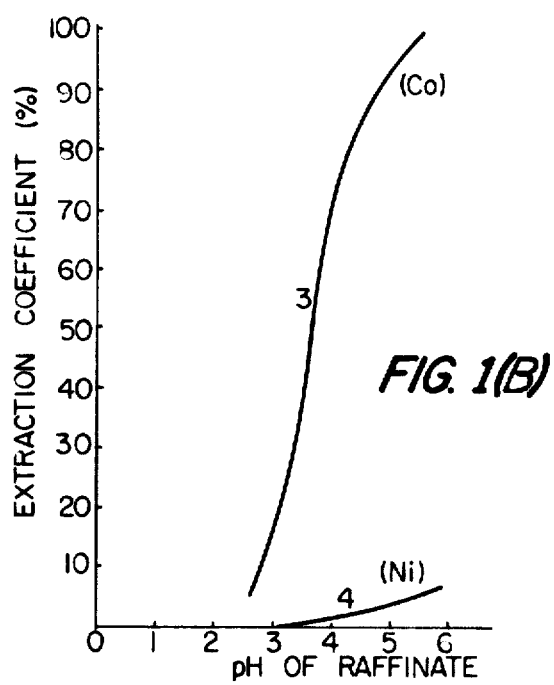
Figure 1C:
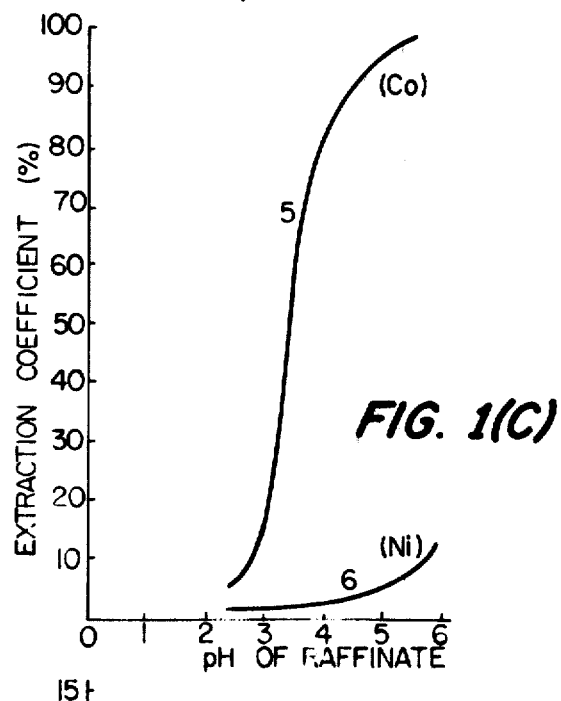
Figure 1D:
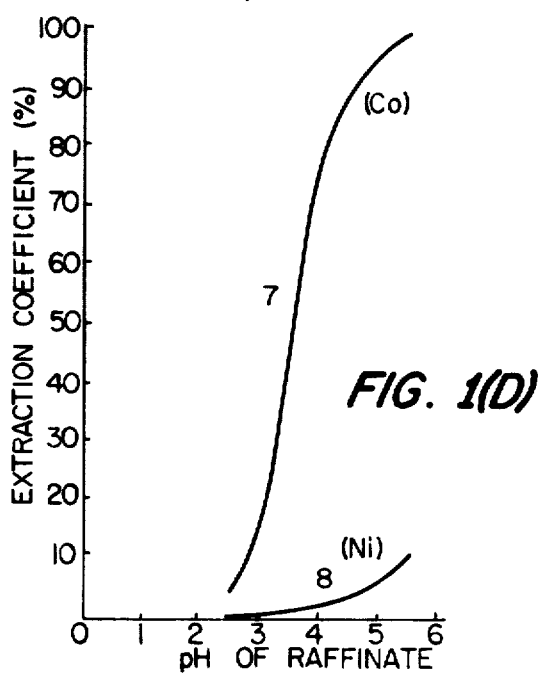

1,3,5,7. Extraction of Co.
2,4,6,8. Extraction of Ni.
9. Maximum concentration curve in the organic phase containing Co alone.
10. Maximum concentration curve in the organic phase containing Ni alone.
11,12. Concentration of Co(11) or Ni(12) in the organic phase from their sulfates.
13,14. Concentration of Co(13) or Ni(14) in the organic phase from their nitrates.
15,16. Concentration of Co(15) or Ni(16) in the organic phase from their chlorides.
17,18. Concentration of Co(17) or Ni(18) in the organic phase at 20° C. from the aqueous sulfates solution.

DETAILED DESCRIPTION OF THE INVENTION

This invention relates to a method for separating Co from Ni by solvent extraction from an aqueous solution containing Co and Ni salts, wherein 2-ethylhexyl phosphonic acid mono-2-ethylhexyl ester (abbreviated as EHPNA) and/or 3,5,5-trimethylhexyl phosphonic acid mono-3,5,5-trimethylhexyl ester(abbreviated as TMHPNA) and/or isodecyl phosphonic acid monoisodecyl ester (abbreviated as IDPNA) are used as the extractant.

Aqueous solutions containing Co and Ni are obtained from the processes, for example, in the hydrometallurgy of ores, the recovery of useful metals from waste catalysts, or the recovery of useful metals from metal scrap. In many cases Ni and Co are present together. Therefore an effective method is necessary to separate and recover pure Co and Ni from such aqueous solutions.

Conventionally, in order to separate Co from Ni in an acidic aqueous solution, a method has been employed which utilizes the pH shift caused by the addition of alkali to the acidic solution to precipitate hydroxides of Co and Ni. There is another method, which is more effective than the above-mentioned one, and which may separate Co and Ni utilizing the difference of their amounts extracted when the acidic aqueous solution is extracted with a solvent via a solvent-solvent extraction technique.

One of the solvent extraction methods can extract and separate Co selectively from the acidic aqueous solution using di-2-ethylhexyl phosphate dissolved in an inert organic solvent as the extractant. In this procedure the aqueous solution containing Co and Ni is mixed so as to contact the organic solvent containing the extractant.

The aqueous solution, i.e. the water phase, and the extracting solvent, i.e. the organic phase, do not dissolve in but are in contact with each other, so that the Co ion may be extracted across the interface into the organic phase.

The organic phase and the water phase, after mixing and making contact with each other, e.g. by stirring for a certain time, are separated into the upper layer and the lower layer, when Co in the aqueous solution is extracted into the organic phase and Ni remains in the water phase of raffinate. However, in the case where Co is extracted into the organic phase by contact of the aqueous solution containing Co and Ni with an organic solvent containing di-2-ethylhexyl phosphoric acid, the separation of Co from Ni is incomplete there are many stages of extraction, because Ni is also abundantly extracted into the organic phase under the conditions of extraction which can recover Co effectively. Therefore a multi-stage contactor is required for the complete separation of Co from Ni.

As described thus far, a large extraction apparatus with a number of stages will be necessary if the conventional method of extraction, which utilizes di-2-ethylhexyl phosphoric acid as the extractant is employed.

Di-2-ethylhexyl phosphoric acid has insufficient ability as an extractant to separate Co from Ni. Therefore, it is necessary to choose an extractant with an excellent ability to separate Co from Ni, for the effective separation of Co from Ni.

This invention is a method for separation of Co from Ni on the basis of those points mentioned above, in which method Co is extracted using EHPNA and/or TMHPNA and/or IDPNA as extractants having a particularly excellent ability to separate Co from Ni in an aqueous solution containing Co and Ni.

The chemical structure of the extractant used in this invention is shown by the formula (1),

R is a 2-ethylhexyl group, 3,5,5-trimethylhexyl group, or isodecyl group.

The procedure of this invention is very simple, and in addition Co can be separated from Ni and be recovered in high purity and in good yield from an aqueous solution containing Co and Ni.

The excellent ability of the extractant to separate Co from Ni decreases drastically the number of stages of the extraction equipment to be used, as compared with the cases where di-2-ethylhexyl phosphoric acid is used as the extractant. That is, the invention can reduce the cost of the equipment and also decrease the necessary amount of the organic solvent for extraction. This leads to the great advantages such as a drastic decrease in investment, a decrease of expense of operation, and in addition, simplification of operational control.

The organic solvent available for this invention is one which contains generally 5 to 100 vol.% and preferably 10 to 40 vol.% of the above-mentioned extractant.

Extraction of Co with the solvent is related to the pH buffer action, and the pH in the extraction is generally in the range of 4 to 6.5. Control of pH is conducted by converting a suitable portion of the acidic group of the extractant in the organic solvent into alkali salts. The value of pH may also be controlled by adding and mixing alkali in the organic phase introduced into the equipment as required. Effective alkali solutions are those which contain ammonium ion, alkali metal ion, or calcium ion, e.g. ammonia, caustic soda, sodium carbonate, calcium hydroxide, etc.

An organic solvent is employed in this invention for dilution and dissolution of the extractant. The solvent should be able to dissolve the extractant to form an organic phase and a water phase at rest at least after the liquid-liquid contact from the metal-containing water phase into the solvent phase. It should also be insoluble in water, and should not inhibit the function of the extractant in the extraction of Co from the solution containing CO and Ni.

Effective solvents are aliphatic hydrocarbons of high flash points, and aromatic hydrocarbons, halogenated hydrocarbons, higher alcohols and ethers, and the mixtures of these compounds may be employed. For example, distillates of petroleum, such as kerosene, naphtha and toluene are suitable.

In the separation of the water phase and the organic phase at rest, the separation of the two phases will be incomplete if emulsion occurs. According to the inventors' experimental results, in such a case, addition of 2 to 5 vol.% of tributyl phosphate or isodecanol was found able to prevent the formation of emulsion without inhibiting the function of the extractant.

The temperature at which liquid-liquid contact and the phase separation are carried out is not important. However the temperature is preferably maintained in the range of 20° to 70° C. in consideration of the flash point of the organic solvent and the rate of phase separation.

The procedure of extraction by the contact of organic solvent and aqueous solution containing Co and Ni used in this invention may be any one of those well-known in the extraction with solvent. That is, although continuous circulation is generally preferred, batch, continuous batch, and batch circulation are also effective. Packed column, pulse column, rotating disc column etc. are preferably used in the countercurrent extraction with multiple stages, but any well-known contact equipment generally used for the solvent extraction is available for this invention. As this invention is very effective in the separation of Co from Ni, it is also advantageous to use a mixer-settler in one to several stages.

The volume ratio of the organic phase to the water phase which are in contact with each other may be varied over a considerable range. The most effective ratio is dependent on the nature and the concentration of the extractant, the diluent, and the material aqueous solution containing Co, and on the method of mixing these liquids, such as the type of the equipment. In general, this ratio is adjusted so that substantially all amount of Co in the solution can be taken into the organic phase, a minimum amount remaining in the raffinate.

After the extraction of Co into the organic phase and the separation of the water phase and the organic phase, the organic phase is transferred to the stripping circuit to make contact with an inorganic acid. The stripping circuit may be operated in an arbitrarily selected apparatus for liquid-liquid contact; for example, the use of a mixer-settler in 1 to 2 stages enables a recovery of substantially all of the Co from the organic phase.

The volume ratio of the organic phase and the inorganic acid depends on the concentration of Co and that of the inorganic acid and may be varied over a considerable range according to the desirable concentration of Co salt in the water phase which has been removed and recovered.

As for the inorganic acid, sulfuric acid, nitric acid or hydrochloric acid of 0.5 to 5 N is advantageous, and the choice is dependent upon the kind of Co salt desired. The organic phase from which Co has been removed is fed back to the extracting circuit.

The arrangement of a scrubbing circuit between the extraction circuit and the stripping circuit is also effective for the purification of Co by removing small amounts of Ni present in the organic phase.

The organic phase is effectively scrubbed by an aqueous solution containing a diluted inorganic acid or Co salt, or by a part of the water phase obtained from the stripping circuit, in the solvent extraction equipment of a well-known design. Co and Ni remaining in the water phase after scrubbing are recovered by feeding back to the extraction circuit.

It is desirable to minimize the content of impurities such as iron, zinc, cupper, arsenic, etc. in the aqueous solution of Co and Ni, prior to the extraction; the impurities may be eliminated from the aqueous solution by an established technique such as precipitation by pH adjustment, etc. These metal ions are extracted more readily than Co and the results in lowering the purity of Co in the organic phase. With this invention, metal salts other than Co and Ni salts, such as those of rare earth metals, Fe, Cr, Zn, Mn, Cu, etc., may be extracted from an aqueous solution containing such metal salts are separated from each other by suitably arranging pH condition and the number of stages of extraction.

In the following, this invention is explained in detail with regard to the examples but of course its application is not limited only to those examples.

EXAMPLE 1

This experiment was carried out in order to compare the Co and Ni separation ability of the extractant in this invention, i.e. EHPNA, TMHPNA, and IDPNA, with that of di-2-ethylhexyl phosphoric acid used conventionally under the same condition. Each extractant was dissolved in kerosene to give a concentration of 20 vol.%. Each solvent was converted into its ammonium salt by addition of ammonia water of a fixed concentration. The solvent thus prepared was brought in contact with an aqueous solution containing cobalt sulfate and nickel sulfate so that the extraction might be performed.

The contact was carried out by shaking for 10 min. in an Erlenmeyer flask in a water-bath with thermostat at 50° C.

The ratio of volume of the water phase to that of the organic phase was 1:1, and the initial concentration of Co and Ni in the aqueous solution was 10 g/l each.

The relation between the pH at extraction, where there is buffering due to the variation of the ratio of ammonium salts in the extractants, and the extraction coefficients (%) of Co and Ni into the organic phase from the aqueous solution containing Co and Ni, is shown in FIGS. 1(A), (B), (C), and (D). FIGS. 1(A), (B), (C), and (D) show the cases where the conventional di-2-ethylhexyl phosphoric acid, EHPNA, TMHPNA, and IDPNA were used, respectively, are the extractant. The curves (1), (3), (5), and (7), and those of (2), (4), (6), and (8) are the extraction curves in relation to pH for Co and Ni, respectively.

As shown in FIG. 1(A), not only Co but also Ni were extracted in a large amount when the conventional di-2-ethylhexyl phosphoric acid was used as the extractant, whereas, when the extractants in this invention were used, the amount of Ni extracted together with Co was remarkably small. It is evident that the agents in this invention, i.e. EHPNA, TMHPNA, and IDPNA, are remarkably superior to the conventionally used di-2-ethylhexyl phosphoric acid.

EXAMPLE 2

(Determination of the amount of the extractant which allows the maximum extraction of Co or Ni.)

The procedure of the experiment was the same as that of Example 1. Namely, a kerosene solution containing 20 vol.% of EHPNA was converted into an ammonium salt solution of an appropriate ratio, and then the resultant solution was brought into contact with an aqueous solution containing Co or Ni so that the ratio of the water phase and the organic phase might be 1:1.

The temperature at extraction was 50° C., and the initial concentrations of the metal in the aqueous solution containing of cobalt sulfate or nickel sulfate were 30 g/l each.

Figure 2A:
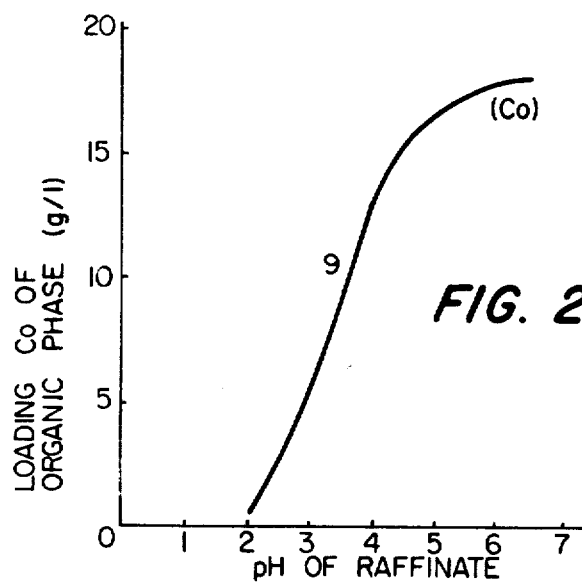
FIGS. 2(A), and (B) show the amount extracted at each pH with the extraction solvent according to this invention; (A) and (B) show the amounts of Co and of Ni, respectively.
Figure 2B:
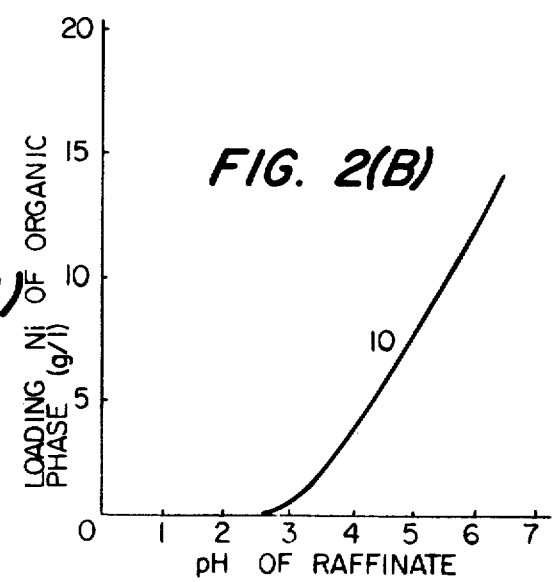

The relation between the concentration of Co or Ni extracted into the organic phase and the pH at extraction is shown in FIG. 2(A) and (B). FIG. 2(A), and (B) are the curves of concentration of the metal in the organic phase (g/l) in relation to the pH of raffinate when Co or Ni was alone present, respectively. In both cases, phase separation was insufficient when the pH was around 7.

The relation between the Co amount extracted and the concentration of EHPNA in the extracting solvent in the range of 5 to 70 vol.%, was studied. The procedure of the experiment was the same as that described above, except that the temperature of extraction was 30° C. The initial concentration of the metal was varied in the same ratio as that of the concentration of EHPNA in the solvent. Then the viscosity of the phase increased with the concentration of EHPNA-Co complex in the organic phase. The pH at equilibrium and the Co amounts extracted within the available range of viscosity are shown in the following table.

| EHPNA in the solvent (vol. %) | CO concentration in the organic phase after extraction (g/l) | pH at equilibrium |
| --- | --- | --- |
| 5 | 3.8 | 5.7 |
| 10 | 7.3 | 5.5 |
| 20 | 15.5 | 5.5 |
| 40 | 27.8 | 5.0 |

-continued

| EHPNA in the solvent (vol. %) | CO concentration in the organic phase after extraction (g/l) | pH at equilibrium |
| --- | --- | --- |
| 70 | 45.8 | 4.4 |

EXAMPLE 3

(Influence of the nature of salts of Co and Ni inthe aqueous solution containing Co and Ni on the extraction result.)

Figure 3A:
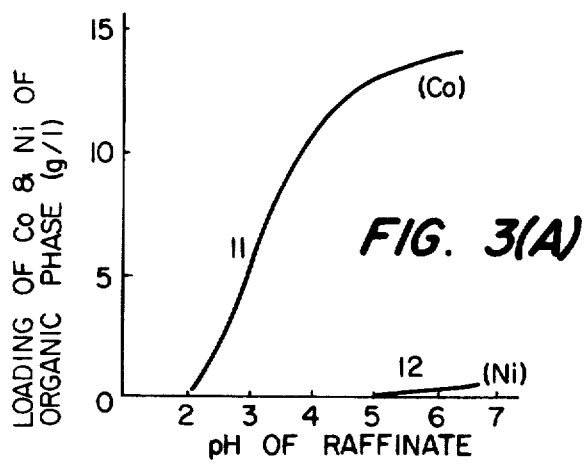
FIGS. 3(A), (B), and (C) show extraction of metals from a few kinds of salt solution with the extraction solvent according to this invention in relation to the nature of the salt; (A), (B), and (C) indicate the cases where sulfate, nitrate and chloride, respectively, were used.
Figure 3B:
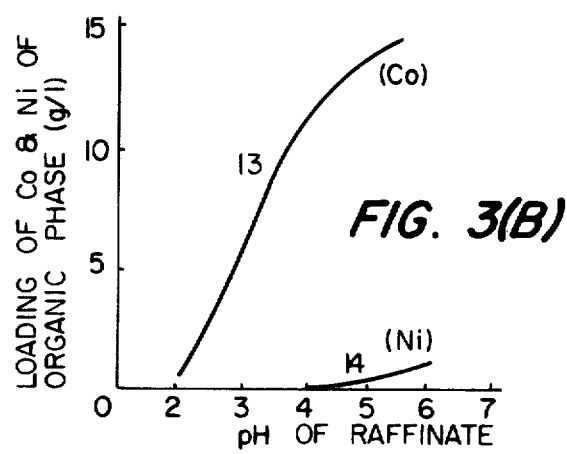
Figure 3C:
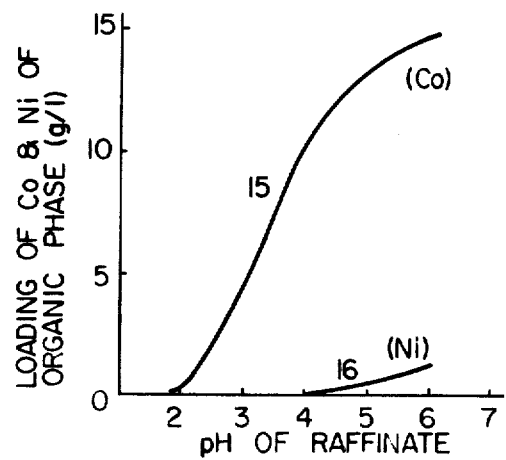

The experiment was carried out on the three kinds of aqueous solution, i.e. those of sulfate, nitrate, and chloride, using a kerosene solution containing 20 vol.% of EHPNA. The procedure was the same as that of Example 1, except that the initial Co and Ni concentrations were 15g/l each. The extraction results in relation to the nature of salts are shown in FIG. 3(A), (B), and (C). FIGS. 3(A), (B), and (C) show the relation of the metal concentration inthe organic phase (g/l) and the pH of the raffinate in the extraction of the sulfate, the nitrate, and the chloride, respectively; the curves (11), (13), and (15) are for Co, and those of (12), (14), and (16) are for Ni.

As is evident from the results shown in FIGS. 3(A), (B), and (C), the nature of salt was found not to affect much on the efficiency of extraction of Co and Ni.

EXAMPLE 4

(Influence of the extraction temperature on the extraction of Co and Ni.)

The extraction experiments were carried out at 20° C. and 50° C.

The procedure was the same as that of Example 3(A), except that the temperature was varied.

Figure 4:
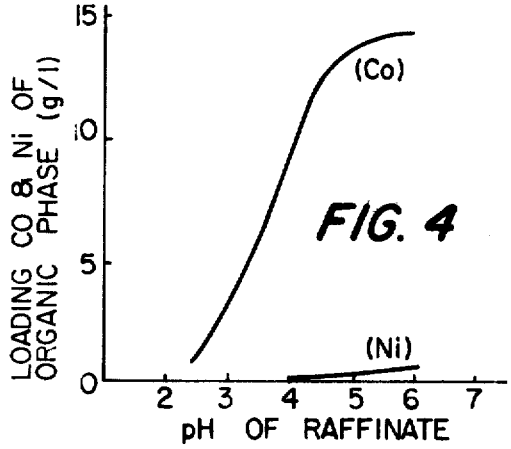
FIG. 4 shows the influence of temperature in extraction of Co and Ni; the result of extraction at 20° C. is given.

FIG. 4 is the result of an extraction at 20° C. of kerosene solution containing 20 vol % of EHPNA from an equivalent volume of an aqueous solution of sulfates of both Ni and Co containing 15 g/l each of Co and Ni; (17) is the extraction curve of Co and (18) is that of Ni.

When FIG. 4 and FIG. 3(A) are compared, the difference of the efficiency of separation of Co from Ni due to temperature is not substantially recognized.

EXAMPLE 5

(Continuous extraction experiment to recover Ni and Co from their aqueous solution by the practical operation.)

For continuous extraction, a mixer-settler with 2 stages was employed because it is most commonly used and in order to show that this invention can practically be applied to a countercurrent liquid-liquid extraction with a few stages.

The countercurrent liquid-liquid contact was conducted as follows. Extracting solvent induced into the mixer of the first stage(F) was brought into contact with the water phase sent from the settler of the second stage (S) by stirring.

The suspension of the organic phase and the water phase was then sent into the settler of the first stage and kept still, when the organic phase and the water phase were separated into the upper (AV-1) and the lower layers (AW-1), respectively. The organic phase (F) containing Co overflowed the settler, was transferred into the second mixer, and was similarly brought in contact with the original aqueous solution containing Co and Ni, by stirring, to be separated into AV-2 and AW-2.

The original aqueous solution containing Co and Ni was induced into the second mixer followed by the contact with the organic phase from the first settler and the phase separation in the second settler, while the water phase was sent to the first mixer in countercurrent against the organic phase.

That is, the organic phase was induced into the first mixer and removed from the second settler, while the water phase was induced into the second mixer and removed from the first settler.

During this process the kerosene solution containing 20 vol.% of EHPNA, given 3.6 volume of ammonia water per 100 volume, was induced into the mixer of 100 ml at the rate of 1.04 l/hr.

The aqueous solution of the sulfates of Co and of Ni was induced at 1 l/hr.

Figure 5:
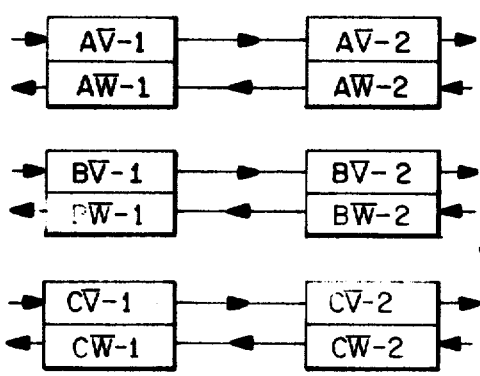
FIG. 5 is an outlined illustration of the operation of the continuous separation; (A), (B), and (C) are the cases where the aqueous sulfate solution contained Co and Ni of 15g/l, 14g/l, and 13g/l each, respectively.

The extraction was carried out at 50 ±3° C. and the result was outlinedly illustrated in FIG. 5, in which (A), (B), and (C) indicate the cases where the concentration of Co and Ni in the sulfate solution were 15 g/l at pH4.6, 14 g/l, and 13 g/l each, respectively.

In FIG. 5(A), AV-1 stands for the organic phase in the first stage (F), and AW-1 for the water phase of raffinate of the same stage, AV-2 for the organic phase of the second stage (S), and AW-2 for the water phase of raffinate of the stage. Similarly BV-1 for the organic phase in the first stage, BW-1 for the water phase of the raffinate of the stage, BV-2 in (B) for the organic phase in the second stage (S), BW-2 for the water phase of the raffinate, CV-1 in (C) for the organic phase of the first stage (F), CW-1 for the raffinate, CV-2 in (C) for the organic phase in the second stage (S), and CW-2 for the water phase of the raffinate.

The concentrations of Co and Ni and pH value of each phase are shown in Table 1.

Table 1.

|      | Co (g/l) | Ni (g/l) | pH  |
|------|----------|----------|-----|
| AW-1 | 0.74     | 14.8     | 5.8 |
| AV-2 | 14.0     | 0.003    | —   |
| BW-1 | 0.12     | 13.7     | 5.8 |
| BV-2 | 13.4     | 0.005    | —   |
| CW-1 | 0.08     | 12.8     | 5.9 |
| CV-2 | 12.7     | 0.005    | —   |

In the experiment of countercurrent extraction with two stages by the mixer-settler illustrated in outline form in FIG. 5, Co was separated in a purity more than 99% and in the recovery more than 99%, while Ni was recovered in the raffinate in a purity more than 99% and with a recovery of 99.9%.

EXAMPLE 6

(The influence of the addition of tributyl phosphate (TBP) and isodecanol to the extracting solvent as an emulsion inhibitor on extraction efficiency.)

In this experiment, after converting the extracting solvent into their ammonium salt by the addition of 3.6 parts of concentrated ammonium water per 100 parts (volume unit) of the extracting solvent, the solvent was brought in contact with 100 parts of an aqueous solution containing Co and Ni. The extraction temperature was 50° C. and the contact time was 10 minutes.

The result is shown in Table 2, in which Solvent A is referred to the kerosene solution containing 20 vol.% of EHPNA, and Solvent B is the kerosene solution containing 20 vol.% of EHPNA together with 2.5 vol.% of TBP and isodecanol each.

The material aqueous solution (a) is a solution of sulfates contaning 14 g/l of Co and Ni each, and (b) is the solution containing 12 g/l of Co ad 16 g/l of Ni.

Table 2.

| Experiment No. | Extracting solvent | Material aqueous solution | Organic phase (g/l) | | Raffinate (g/l) | | pH at extraction |
|---|---|---|---|---|---|---|---|
| | | | Co | Ni | Co | Ni | |
| 1 | A | (a) | 13.6 | 0.66 | 0.2] | 13.4 | 5.6 |
| 2 | B | (a) | 13.0 | 0.42 | 0.90 | 13.6 | 5.5 |
| 3 | B | (b) | 11.9 | 1.5 | 0.25 | 14.0 | 5.7 |

As is clear from the result shown in Table 2, the addition of an emulsion inhibitor, TBP or isodecanol, does not affect the extraction efficiency of extractants.

EXAMPLE 7

(Experiment of stripping of Co from the organic phase into which Co eas extracted.)

The experiment was carried out with the Co-containing organic phase obtained in Example 6, using 1 N or 0.5 N sulfuric acid, or 0.5 N nitric acid as the solution for stripping.

The ratio of the volume of the organic phase to that of the water phase was 1:0.5 in all cases, the contact time being 5 min.

The result is shown in Table 3.

Table 3

| Experiment No. | Treated organic phase | Solution for stripping | Times of stripping | Water phase after the experiment (g/l) | | Organic phase after the experiment (g/l) | |
|---|---|---|---|---|---|---|---|
| | | | | Co | Ni | Co | Ni |
| 1 | Example | N—H$_2$SO$_4$ | 1 | 25.2 | 0.82 | | |
| 2 | -6. Experiment | | 2 | 0.16 | 0.01 | | |
| 3 | No. 3 | | 3 | 0.00 | 0.00 | <0.00 | <0.00 |
| 4 | Example | 0.5N—H$_2$SO$_4$ | 1 | 13.0 | 0.82 | | |
| 5 | -6. Experiment | | 2 | 11.8 | 0.02 | | |
| 6 | No.3 | | 3 | 0.09 | 0.00 | <0.00 | <0.00 |
| 7 | Example | 0.5N—HNO$_3$ | 1 | 11.13 | 2.94 | | |
| 8 | -6. Experiment | | 2 | 11.63 | 0.13 | | |
| 9 | No. 3 | | | 0.12 | 0.00 | <0.00 | <0.00 |

Table 3 shows the case where H$_2$SO$_4$ or HNO$_3$ was used for stripping, but when hydrochloric acid is used as the solution for stripping, Co may also be easily removed from the organic phase similarly.

EXAMPLE 8

A scrubbing test was performed in order to eliminate a small amount of Ni that has been extracted together with Co into the orgaic phase.

The organic phase after extraction of Experiment No. 3 in Example 6 was subjected to this experiment, using the water phase after the stripping test of Experiment No. 7 in Example 7 and the aqueous sulfate solution containing 13 g/l of Co, as the scrubbing solution.

The contact for scrubbing was done for 10 min. at the ratio of the volume of organic phase to that of water phase of 1:0.5 in all cases.

Table 4.

|  | Volume Ratio | Organic phase (g/l) Co | Organic phase (g/l) Ni | Water phase (g/l) Co | Water phase (g/l) Ni | pH of water phase |
|---|---|---|---|---|---|---|
| Organic phase before scrubbing | 2 | 11.9 | 1.5 |  |  |  |
| Recovered solution for stripping | 1 |  |  | 13.0 | 0.82 | 3.2 |
| After scrubbing |  | 13.5 | 0.09 | 11.8 | 4.1 | 4.7 |
| CoSO₄ solution for scrubbing | 1 |  |  | 13.0 | 0.00 | 4.5 |
| After scrubbing |  | 13.7 | 0.11 | 11.5 | 3.2 | 4.8 |

As is shown in Table 4, Ni in the organic phase was eliminated to become less than 1/10 of the original concentration, while the organic phase could extract a small amount of Co with this contact so that the concentration of Co increased.

Co and Ni lost into the raffinate on scrubbing was recovered by feeding back to the extraction circuit.

By an appropriate combination of extraction circuit, scrubbing circuit, and stripping circuit, as is done in Example 6 to 8, separation of Co and Ni in sufficiently high purity and in high yield was found to be attained conveniently with a solvent extraction equipment with comparatively few stages.

In Example 2 to 8 EHPNA was used as the extractant but similar results may be obtained even if the other extractants in this invention, TMHPNA and IDPNA, are used.

We claim:

1. A process for separating cobalt from nickel in an aqueous solution containing the above-mentioned metals, with consists essentially of (A) contacting the said solution with an organic extraction solvent comprising a mono-alkyl alkylphosphonic acid as extractant and having the general formula:

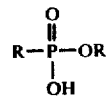

wherein R represents 2-ethylhexyl, 3,5,5-trimethylhexyl, or isodecyl,
whereby cobalt is extracted from the aqueous solution into the organic phase, and (B) subsequently separating the resultant cobalt loaded organic phase from the aqueous phase.

2. The process of claim 1 wherein the said extractant is mono-2-ethylhexyl 2-ethylhexylphosphonic acid, mono-3,5,5-trimethylhexyl, 3,5,5-trimethylhexylphosphonic acid, or monoisodecyl isodecylphosphonic acid, or mixtures thereof.

3. The process of claim 1 wherein the extraction is performed within the pH range of from about 5 to 6.5.

4. The process of claims 1 or 2 wherein the organic extraction solvent comprises the said extractant in an amount of from 5 to 100% by volume.

5. The process of claims 1 or 2 wherein the organic extraction solvent comprises the said extractant in an amount of from 10 to 40% by volume.

6. The process of claim 4 wherein the said extractant further comprises an aliphatic hydrocarbon, aromatic hydrocarbon, or mixtures thereof.

7. The process of claims 1 to 3 wherein the organic extraction solvent contains an emulsion inhibitor.

8. The process of claims 1 to 3 wherein the emulsion inhibitor is tributyl phosphate or isodecanol.

9. The process of claims 1 to 3 wherein said cobalt loaded organic phase is scrubbed by contact with (a) diluted inorganic acid or (b) an aqueous solution containing cobalt salt.

* * * * *